US010104490B2

United States Patent
Family et al.

(10) Patent No.: US 10,104,490 B2
(45) Date of Patent: Oct. 16, 2018

(54) OPTIMIZING THE PERFORMANCE OF AN AUDIO PLAYBACK SYSTEM WITH A LINKED AUDIO/VIDEO FEED

(71) Applicant: Apple Inc., Cupertino, CA (US)

(72) Inventors: Afrooz Family, Emerald Hills, CA (US); Martin E. Johnson, Los Gatos, CA (US); Baptiste P. Paquier, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/499,829

(22) Filed: Apr. 27, 2017

(65) Prior Publication Data

US 2017/0230776 A1 Aug. 10, 2017

Related U.S. Application Data

(63) Continuation of application No. 15/504,314, filed as application No. PCT/US2014/051553 on Aug. 18, 2014.

(51) Int. Cl.
*H04S 7/00* (2006.01)
*G06T 7/70* (2017.01)

(52) U.S. Cl.
CPC ............... *H04S 7/301* (2013.01); *G06T 7/70* (2017.01); *H04S 7/305* (2013.01); *G06T 2207/10016* (2013.01); *H04S 2400/11* (2013.01)

(58) Field of Classification Search
CPC . H04S 7/301; H04S 7/40; H04S 7/302; H04S 7/307; H04R 29/008; H04R 2205/24; H04R 3/12; H04R 5/04; H04R 1/403

(Continued)

(56) References Cited

U.S. PATENT DOCUMENTS 6,798,889 B1 * 9/2004 Dicker .................... H04S 7/301
381/103
2004/0213415 A1 * 10/2004 Rama ....................... G01H 7/00
381/63

(Continued)

FOREIGN PATENT DOCUMENTS

DE 102004004068 A1 8/2015

OTHER PUBLICATIONS

PCT International Search Report and Written Opinion for PCT International Appln No. PCT/US2014/051553 dated Apr. 22, 2015 (10 pages).

(Continued)

*Primary Examiner* — Melur Ramakrishnaiah
(74) *Attorney, Agent, or Firm* — Womble Bond Dickinson (US) LLP

(57) ABSTRACT

An audio system is provided that efficiently detects speaker arrays and configures the speaker arrays to output sound. In this system, a computing device may record the addresses and/or types of speaker arrays on a shared network while a camera captures video of a listening area, including the speaker arrays. The captured video may be analyzed to determine the location of the speaker arrays, one or more users, and/or the audio source in the listening area. While capturing the video, the speaker arrays may be driven to sequentially emit a series of test sounds into the listening area and a user may be prompted to select which speaker arrays in the captured video emitted each of the test sounds. Based on these inputs from the user, the computing device may determine an association between the speaker arrays on the shared network and the speaker arrays in the captured video.

24 Claims, 13 Drawing Sheets

(58) Field of Classification Search
USPC .......................................... 381/303, 103, 307
See application file for complete search history.

(56) References Cited

U.S. PATENT DOCUMENTS

2009/0323991 A1   12/2009  Hudson et al.
2012/0113224 A1*   5/2012  Nguyen ............... G06K 9/0057
                                                    348/46
2016/0021481 A1*   1/2016  Johnson .................. H04R 3/12
                                                    381/303

OTHER PUBLICATIONS

PCT International Preliminary Report on Patentability for PCT/US2014/051553, dated Mar. 2, 2017.

* cited by examiner

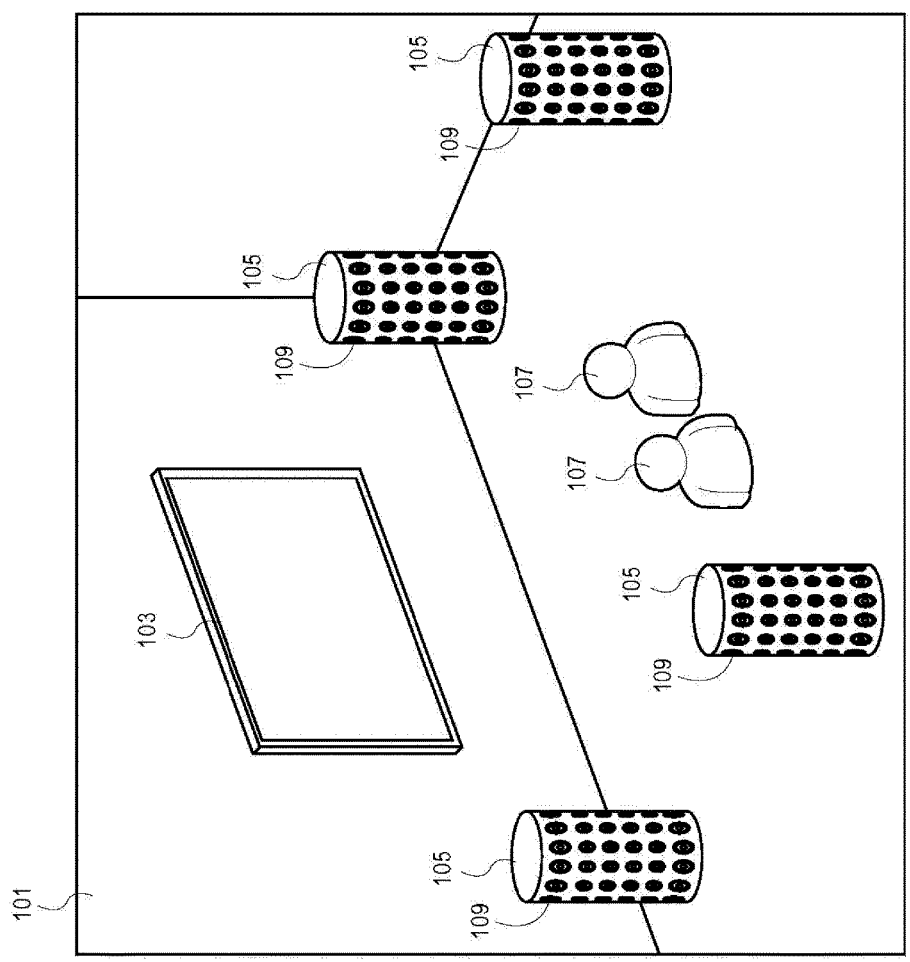

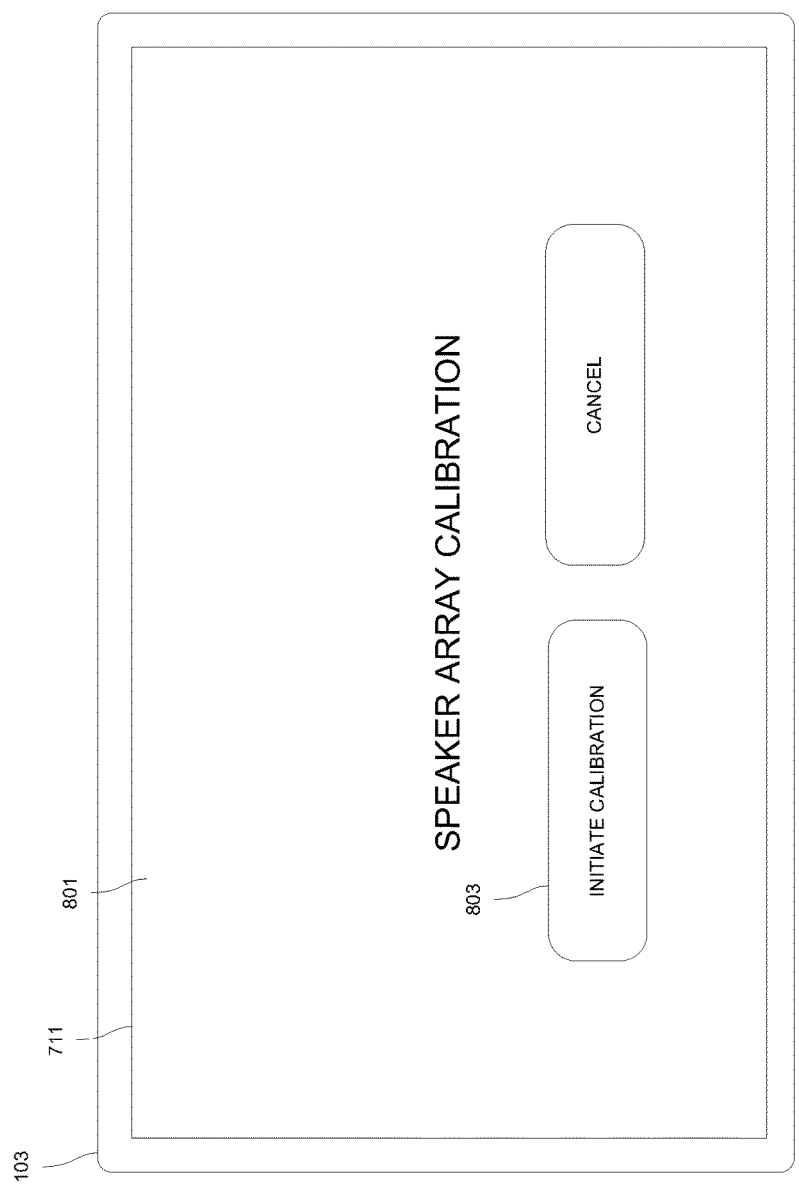

OPTIMIZING THE PERFORMANCE OF AN AUDIO PLAYBACK SYSTEM WITH A LINKED AUDIO/VIDEO FEED

This application is a continuation of U.S. patent application Ser. No. 15/504,314, filed Feb. 15, 2017, which is a U.S. National Phase Application under 35 U.S.C. § 371 of International Application No. PCT/US2014/051553, filed Aug. 18, 2014.

FIELD

An audio system that automates the detection, setup, and configuration of distributed speaker arrays using video and/or audio sensors is disclosed. Other embodiments are also described.

BACKGROUND

Speaker arrays may reproduce pieces of sound program content to a user through the use of one or more audio beams. For example, a set of speaker arrays may reproduce front left, front center, and front right channels for a piece of sound program content (e.g., a musical composition or an audio track for a movie). Although speaker arrays provide a wide degree of customization through the production of audio beams, conventional speaker array systems must be manually configured each time a new user and/or a new speaker array are added to the system. This requirement for manual configuration may be burdensome and inconvenient as speaker arrays are added to a listening area or moved to new locations within the listening area.

SUMMARY

An audio system is provided that efficiently detects speaker arrays in a listening area and configures the speaker arrays to output sound. In one embodiment, the audio system may include a computing device that operates on a shared network with one or more speaker arrays and an audio source. The computing device may detect and record the addresses and/or types of speaker arrays on the shared network. In one embodiment, a camera associated with the computing device may capture a video of the listening area, including the speaker arrays. The captured video may be analyzed to determine the location of the speaker arrays, one or more users, and/or the audio source in the listening area. These determined locations may be determined relative to objects within the listening area.

While capturing the video, the speaker arrays may be driven to sequentially emit a series of test sounds into the listening area. As the test sounds are being emitted, a user may be prompted to select which speaker arrays in the captured video emitted each of the test sounds. Based on these inputs from the user, the computing device may determine an association between the speaker arrays on the shared network and the speaker arrays in the captured video. This association indicates a position of the speaker arrays detected on the shared network based on the previously determined locations of the speaker arrays in the captured video.

Using the determined locations, the computing device may assign roles to each of the speaker arrays on the shared network. These roles may be transmitted to the speaker arrays and the audio source. In some embodiments, the test sounds emitted by the speaker arrays and the captured video captured by the computing device may be further analyzed to determine the geometry and/or characteristics of the listening area. This information may also be forwarded to the speaker arrays and/or the audio source. By understanding the configuration of the speaker arrays and the geometry/characteristics of the listening area, the speaker arrays may be driven to more accurately image sounds to the users.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 5B shows four speaker arrays within a listening area.

FIG. 8A shows a user interface for initiating calibration of the speaker arrays according to one embodiment.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
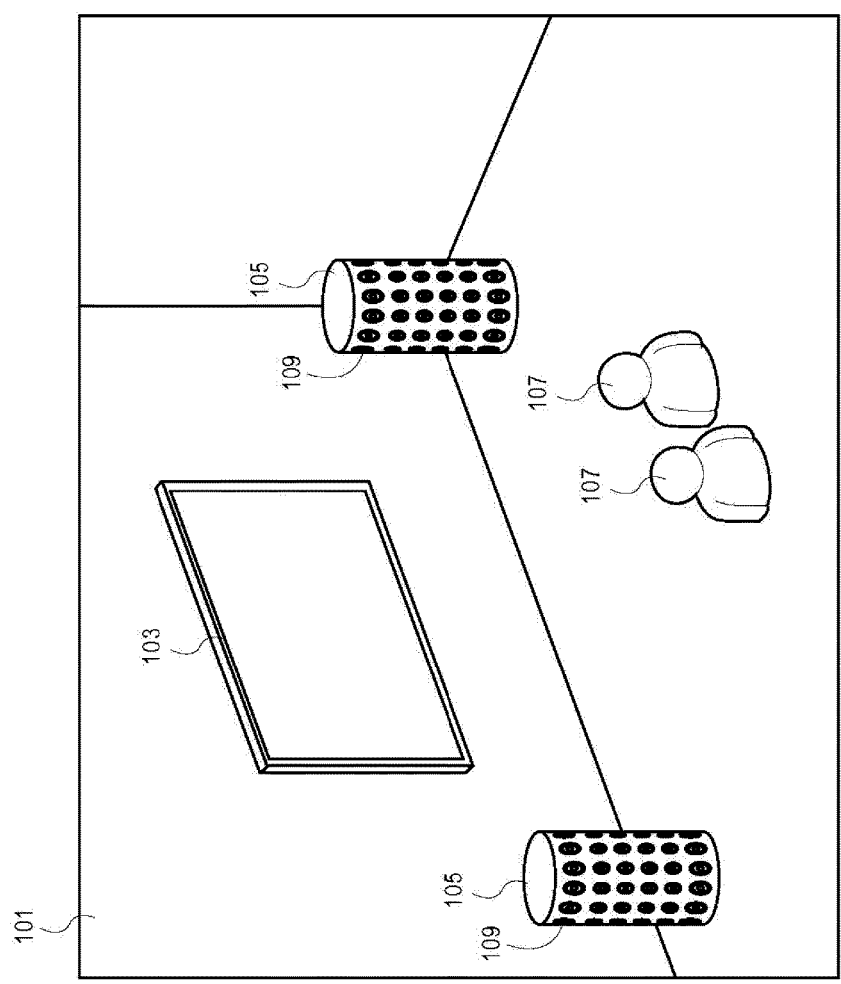
FIG. 1 shows a view of a listening area with an audio source, a set of speaker arrays, and a set of users according to one embodiment.

FIG. 1 shows a view of a listening area 101 with an audio source 103, speaker arrays 105, and a set of users 107. The audio source 103 may be coupled to the speaker arrays 105 to drive individual transducers 109 in the speaker array 105 to emit various sound beam patterns into the listening area

101. In one embodiment, the speaker arrays 105 may be configured to generate audio beam patterns that represent individual channels for multiple pieces of sound program content. For example, the speaker arrays 105 may generate beam patterns that represent front left, front right, and front center channels for pieces of sound program content (e.g., a musical composition or an audio track for a movie). The techniques for determining the location of each speaker array 105 in the listening area 101 will be described in greater detail below.

As shown in FIG. 1, the listening area 101 is a room or another enclosed space. For example, the listening area 101 may be a room in a house, a theatre, etc. Although shown as an enclosed space, in other embodiments, the listening area 101 may be an outdoor area or location, including an outdoor arena. In each embodiment, the speaker arrays 105 may be placed in different positions in the listening area 101 to produce sound that will be perceived by the set of users 107.

Figure 2A:
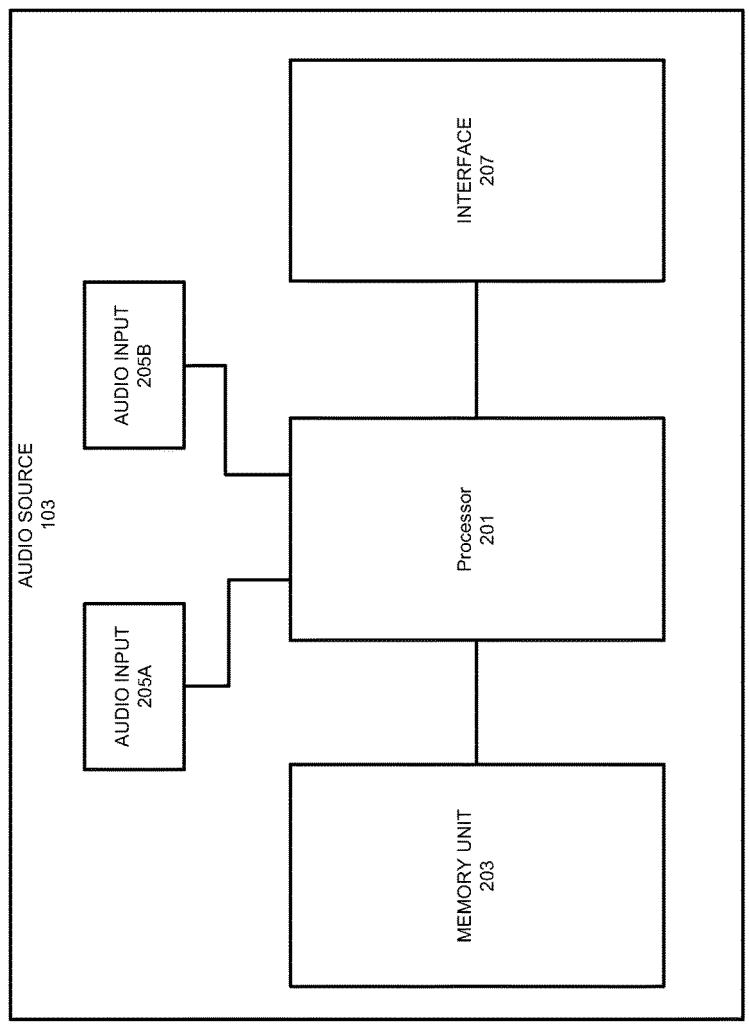
FIG. 2A shows a component diagram of the audio source according to one embodiment.

FIG. 2A shows a component diagram of the audio source 103 according to one embodiment. As shown in FIG. 1, the audio source 103 is a television; however, the audio source 103 may be any electronic device that is capable of transmitting audio content to the speaker arrays 105 such that the audio content may be played through the speaker arrays 105. For example, in other embodiments the audio source 103 may be a desktop computer, a laptop computer, a tablet computer, a home theater receiver, a set-top box, and/or a mobile device (e.g., a smartphone). As shown in FIG. 2A, the audio source 103 may include a hardware processor 201 and/or a memory unit 203.

The processor 201 and the memory unit 203 are generically used here to refer to any suitable combination of programmable data processing components and data storage that conduct the operations needed to implement the various functions and operations of the audio source 103. The processor 201 may be an applications processor typically found in a smart phone, while the memory unit 203 may refer to microelectronic, non-volatile random access memory. An operating system may be stored in the memory unit 203 along with application programs specific to the various functions of the audio source 103, which are to be run or executed by the processor 201 to perform the various functions of the audio source 103.

The audio source 103 may include one or more audio inputs 205 for receiving audio signals from an external and/or a remote device. For example, the audio source 103 may receive audio signals from a streaming media service and/or a remote server. The audio signals may represent one or more channels of a piece of sound program content (e.g., a musical composition or an audio track for a movie). For example, a single signal corresponding to a single channel of a piece of multichannel sound program content may be received by an input 205 of the audio source 103. In another example, a single signal may correspond to multiple channels of a piece of sound program content, which are multiplexed onto the single signal.

In one embodiment, the audio source 103 may include a digital audio input 205A that receives digital audio signals from an external device and/or a remote device. For example, the audio input 205A may be a TOSLINK connector or a digital wireless interface (e.g., a wireless local area network (WLAN) adapter or a Bluetooth receiver). In one embodiment, the audio source 103 may include an analog audio input 205B that receives analog audio signals from an external device. For example, the audio input 205B may be a binding post, a Fahnestock clip, or a phono plug that is designed to receive a wire or conduit and a corresponding analog signal.

Although described as receiving pieces of sound program content from an external or remote source, in some embodiments pieces of sound program content may be stored locally on the audio source 103. For example, one or more pieces of sound program content may be stored on the memory unit 203.

In one embodiment, the audio source 103 may include an interface 207 for communicating with the speaker arrays 105. The interface 207 may utilize wired mediums (e.g., conduit or wire) to communicate with the speaker arrays 105. In another embodiment, the interface 207 may communicate with the speaker arrays 105 through a wireless connection as shown in FIG. 1. For example, the network interface 207 may utilize one or more wired or wireless protocols and standards for communicating with the speaker arrays 105, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards.

Figure 2B:
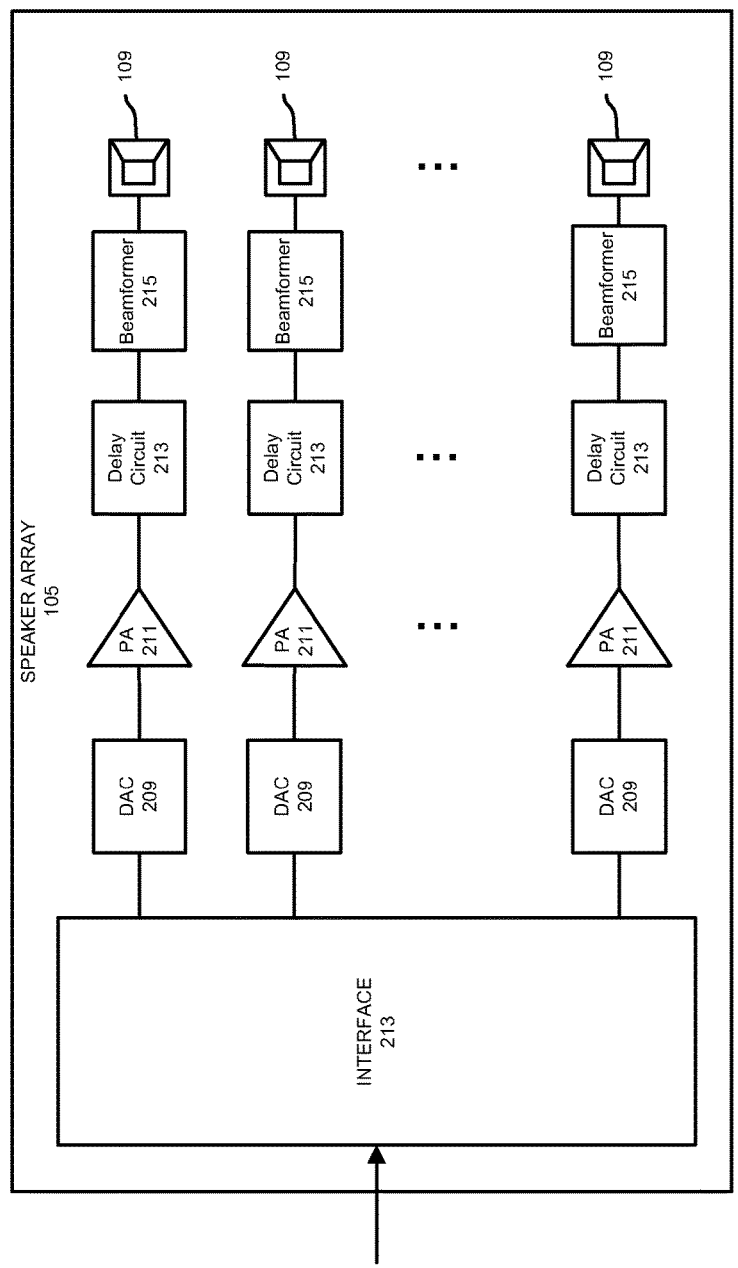
FIG. 2B shows a component diagram of a speaker array according to one embodiment.

As shown in FIG. 2B, the speaker arrays 105 may receive audio content from the audio source 103 through a corresponding interface 213. The audio content may thereafter be processed by the speaker array 105 to drive one or more of the transducers 109 in the arrays 105. As with the interface 207, the interface 213 may utilize wired protocols and standards and/or one or more wireless protocols and standards, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards. In some embodiments, the speaker arrays 105 may include digital-to-analog converters 209, power amplifiers 211, delay circuits 213, and beamformers 215 for driving one or more transducers 109 in the speaker arrays 105.

Although described and shown as being separate from the audio source 103, in some embodiments, one or more components of the audio source 103 may be integrated within the speaker arrays 105. For example, one or more of the speaker arrays 105 may include the hardware processor 201, the memory unit 203, and the one or more audio inputs 205 of the audio source 103. In some embodiments, one of the speaker arrays 105 may be designated as the master speaker array 105 and include the components of the audio source 103. In this configuration, the designated master speaker array 105 may be responsible for distributing audio content to each of the other speaker arrays 105 in the listening area 101.

Figure 3A:
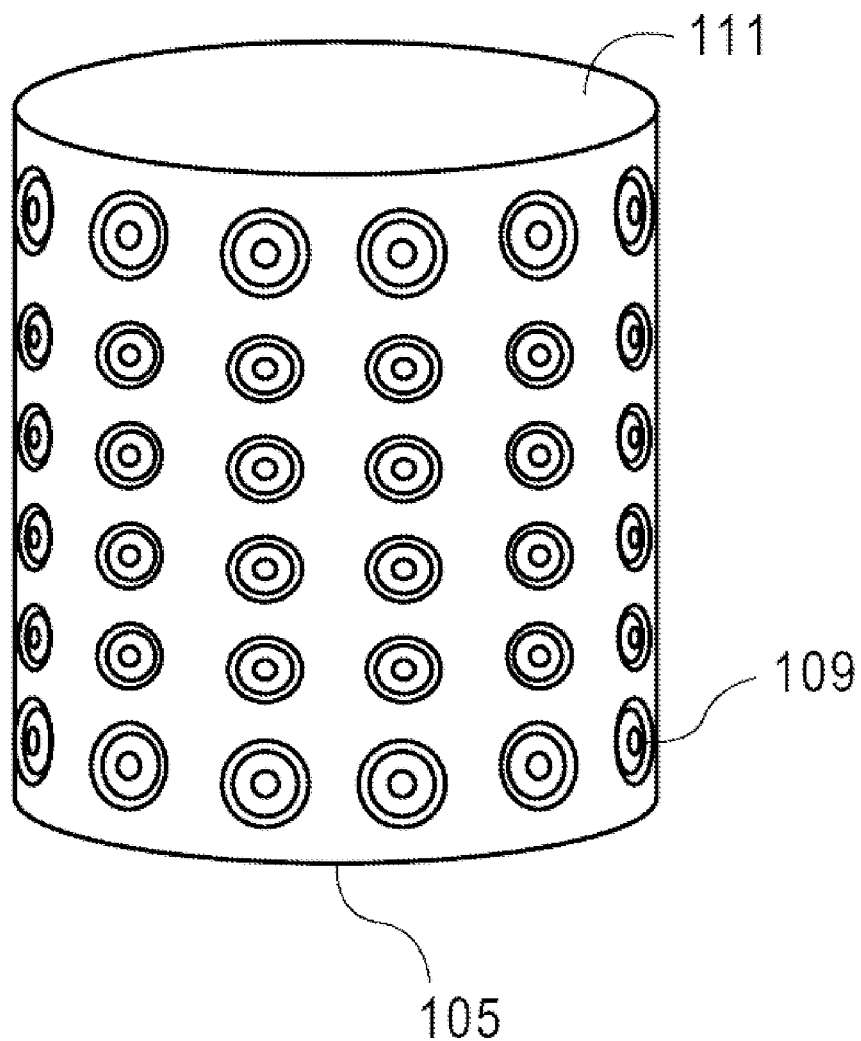
FIG. 3A shows a side view of a speaker array according to one embodiment.

FIG. 3A shows a side view of one of the speaker arrays 105. As shown in FIG. 3A, each of the speaker arrays 105 may house multiple transducers 109 in a curved cabinet 111. As shown, the cabinet 111 is cylindrical; however, in other embodiments the cabinet 111 may be in any shape, including a polyhedron, a frustum, a cone, a pyramid, a triangular prism, a hexagonal prism, or a sphere.

Figure 3B:
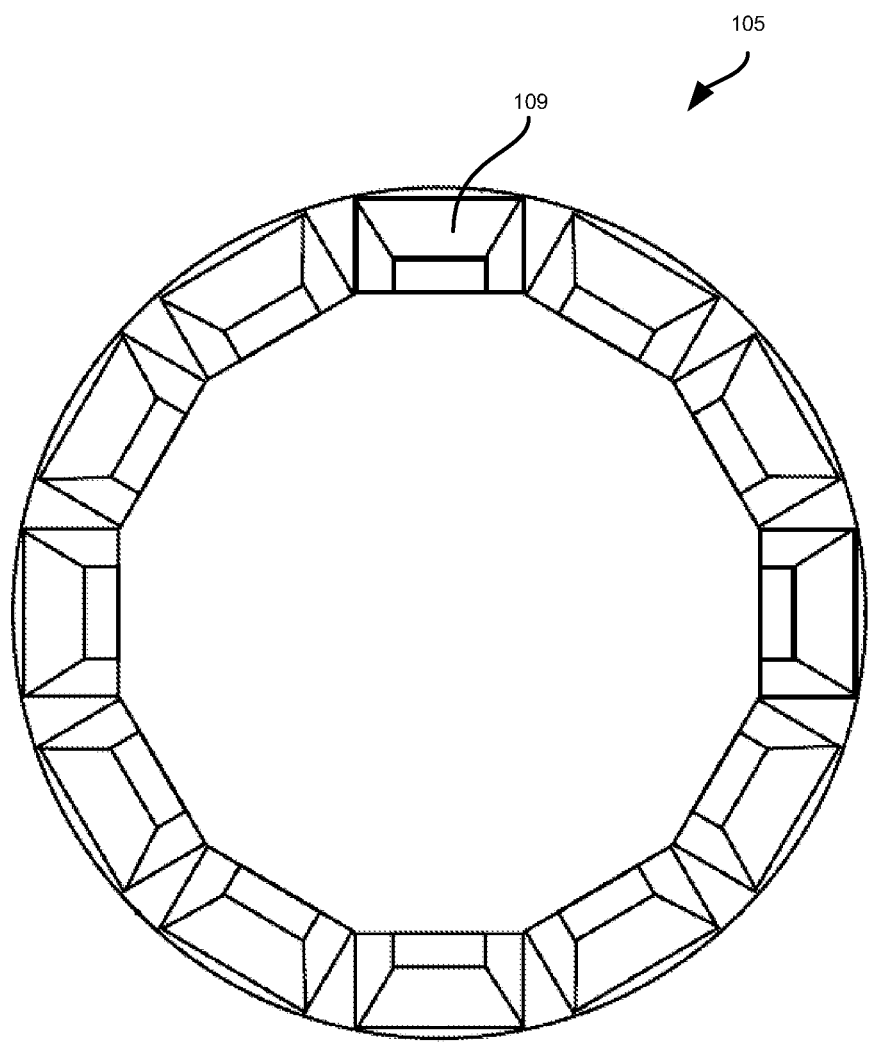
FIG. 3B shows an overhead, cutaway view of a speaker array according to one embodiment.

FIG. 3B shows an overhead, cutaway view of a speaker array 105 according to one embodiment. As shown in FIGS. 3A and 3B, the transducers 109 in the speaker array 105 encircle the cabinet 111 such that transducers 109 cover the curved face of the cabinet 111. Although shown as being uniformly covered by transducers 109, in other embodiments the speaker arrays 105 may be arranged on the cabinet 111 in a non-uniform manner. The transducers 109 may be any combination of full-range drivers, mid-range drivers, subwoofers, woofers, and tweeters. Each of the transducers 109 may use a lightweight diaphragm, or cone, connected to a rigid basket, or frame, via a flexible suspension that constrains a coil of wire (e.g., a voice coil) to move axially through a cylindrical magnetic gap. When an electrical audio signal is applied to the voice coil, a magnetic field is created by the electric current in the voice coil, making it a variable electromagnet. The coil and the transducers' 109 magnetic system interact, generating a mechanical force that causes the coil (and thus, the attached cone) to move back and forth, thereby reproducing sound under the control of the applied electrical audio signal coming from an audio source, such as the audio source 103. Although electromagnetic dynamic loudspeaker drivers are described for use as the transducers 109, those skilled in the art will recognize that other types of loudspeaker drivers, such as piezoelectric, planar electromagnetic and electrostatic drivers are possible.

Figure 4:
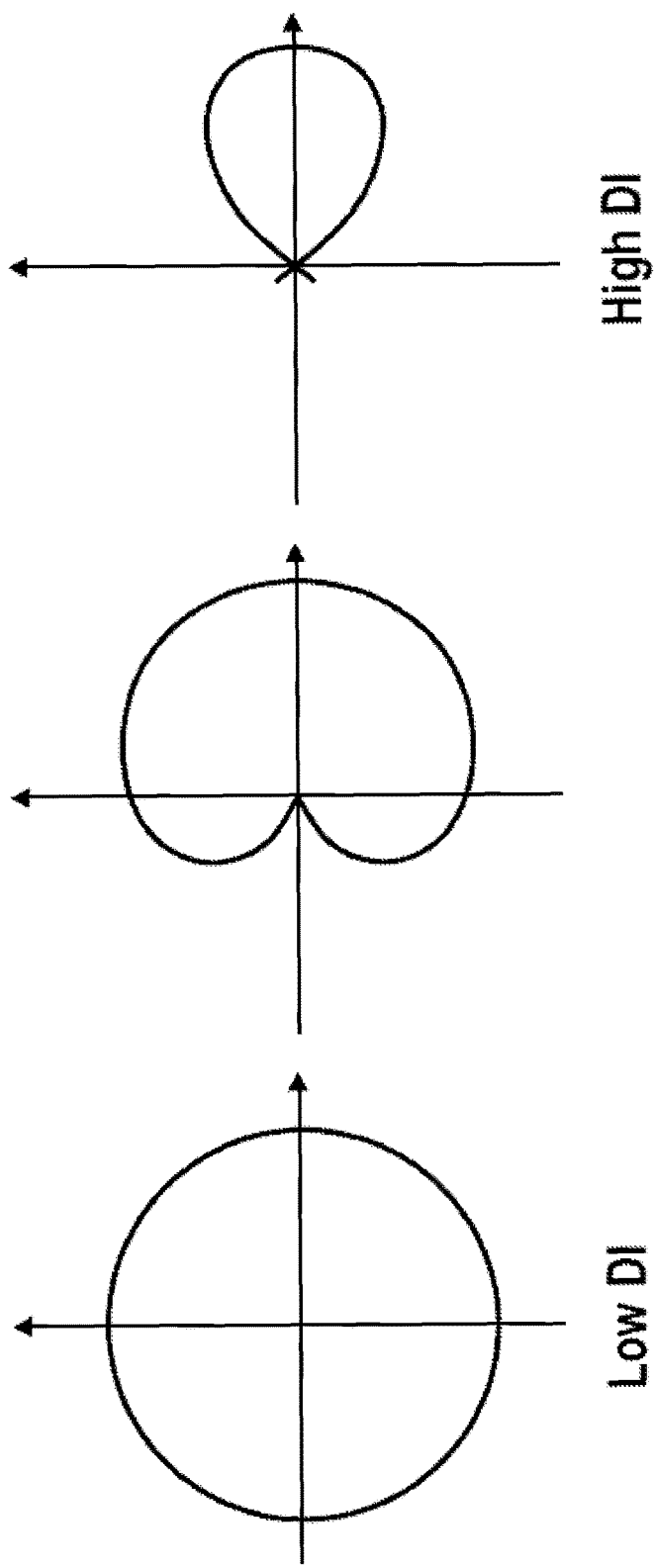
FIG. 4 shows three example beam patterns according to one embodiment.

Each transducer 109 may be individually and separately driven to produce sound in response to separate and discrete audio signals received from an audio source (e.g., the audio receiver 103). By allowing the transducers 109 in the speaker arrays 105 to be individually and separately driven according to different parameters and settings (including delays and energy levels), the speaker arrays 105 may produce numerous directivity/beam patterns that accurately represent each channel of a piece of sound program content output by the audio source 103. For example, in one embodiment, the speaker arrays 105 may individually or collectively produce one or more of the directivity patterns shown in FIG. 4.

Figure 5A:
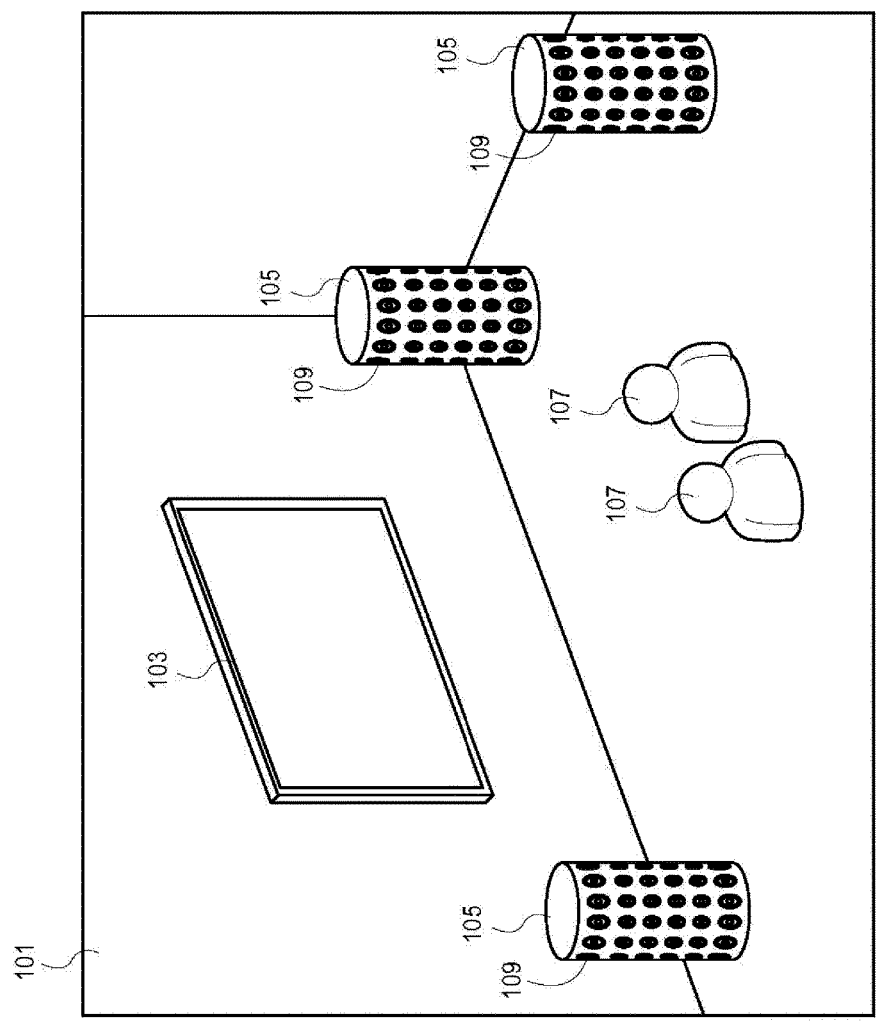
FIG. 5A shows three speaker arrays within a listening area.

Although shown in FIG. 1 as including two speaker arrays 105, in other embodiments a different number of speaker arrays 105 may be used. For example, as shown in FIG. 5A three speaker arrays 105 may be used within the listening area 101 while as shown in FIG. 5B four speaker arrays 105 may be used within the listening area 101. The number, type, and positioning of speaker arrays 105 may vary over time. For example, a user 107 may move one of the speaker arrays 105 during playback of a movie.

Figure 6:
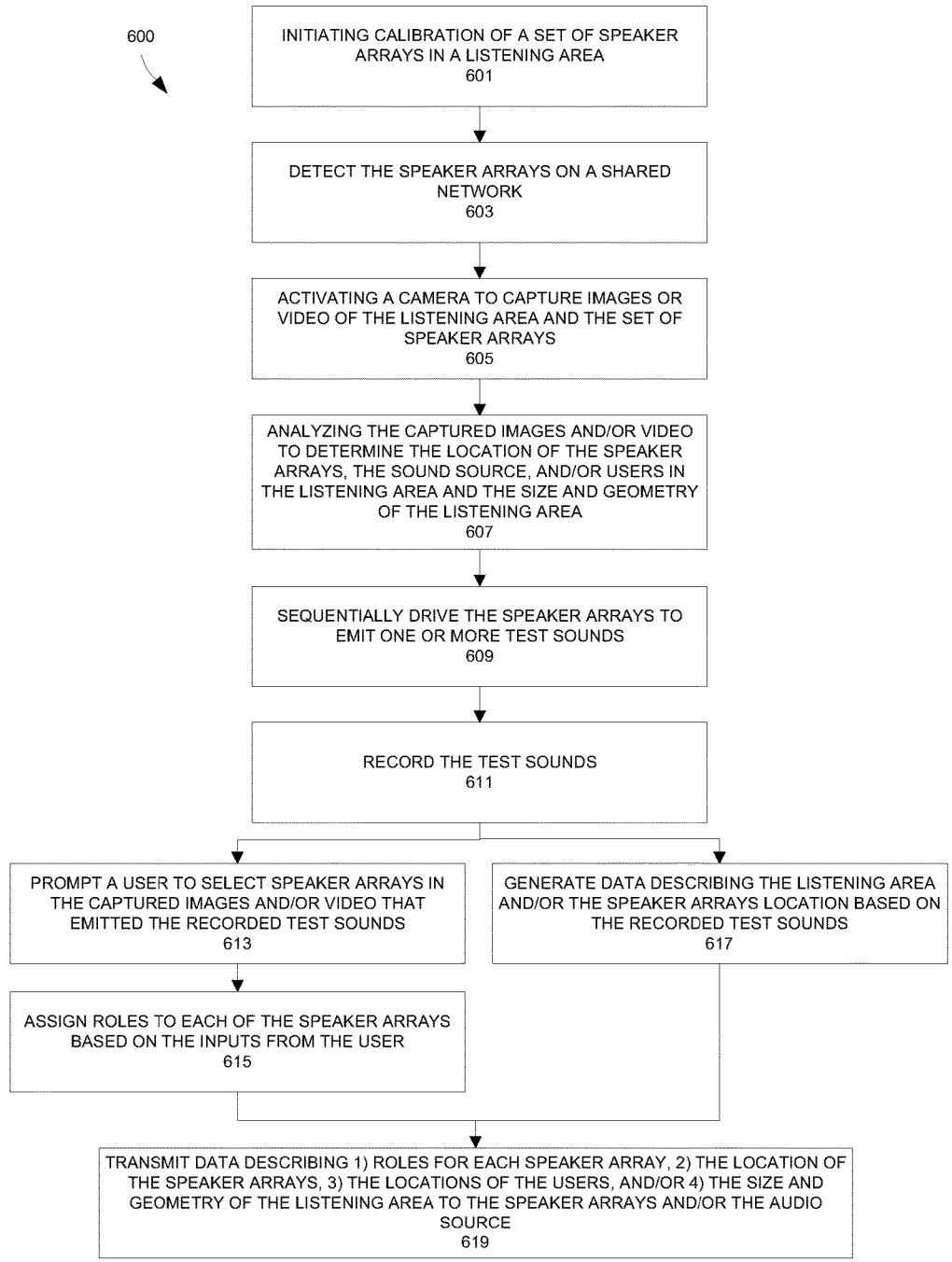
FIG. 6 shows a method for determining the layout of the speaker arrays in the listening area according to one embodiment.

In one embodiment, the layout of the speaker arrays 105 in the listening area 101 may be determined using a computing device that is equipped with a camera. For example, FIG. 6 shows a method 600 for determining the layout of the speaker arrays 105 in the listening area 101 according to one embodiment. In one embodiment, each operation of the method 600 may be performed by the audio source 103, one or more of the speaker arrays 105, and a computing device separate from the audio source 103 and the speaker arrays 105. Each operation of the method 600 will be described below by way of example.

Figure 7:
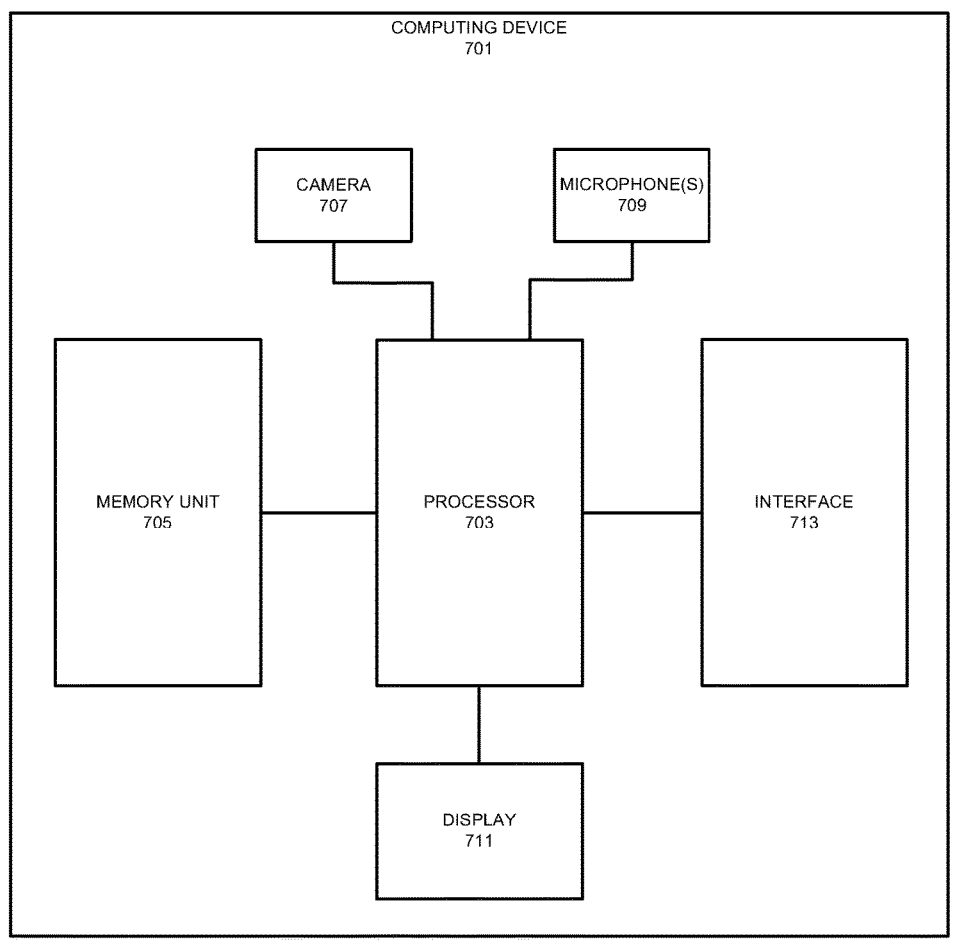
FIG. 7 shows a component diagram of a computing device according to one embodiment.

The method 600 may commence at operation 601 with the user 107 initiating calibration of the speaker arrays 105. In one embodiment, the user may initiate calibration through the use of an application and associated user interface on a computing device external to the speaker arrays 105 and the audio source 103. For example, FIG. 7 shows a component diagram of a computing device 701 according to one embodiment. The computing device 701 may include a hardware processor 703, a memory unit 705, a camera 707, one or more microphones 709, a display 711, and a network interface 713. The computing device 701 may be a desktop computer, a laptop computer, a tablet computer, and/or a mobile device (e.g., a smartphone).

The processor 703 and the memory unit 705 are generically used here to refer to any suitable combination of programmable data processing components and data storage that conduct the operations needed to implement the various functions and operations of the computing device 701. The processor 703 may be an applications processor typically found in a smart phone, while the memory unit 705 may refer to microelectronic, non-volatile random access memory. An operating system may be stored in the memory unit 705 along with application programs specific to the various functions of the computing device 701, which are to be run or executed by the processor 703 to perform the various functions of the computing device 701.

The computing device 701 may be in communication with one or more of the speaker arrays 105 and/or the audio source 103 through the network interface 713. For example, the network interface 713 may be a wired and/or wireless interface that may connect the computing device 701 to a network shared with the speaker arrays 105 and/or the audio source 103. The network may operate using one or more protocols and standards, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards. In one embodiment, one of the users 107 may initiate calibration of the speaker arrays 105 at operation 601 through the selection of the initiate button 803 in the interface 801 shown in FIG. 8A. The selection may be performed through any selection mechanism, including a touch interface, a mouse, a keyboard, etc.

Although described as being initiated by a user 107, in other embodiments, calibration of the speaker arrays 105 may be performed without direct user input. For example, the calibration may be initiated at a prescribed time interval (e.g., ten minute intervals) and/or when the speaker arrays 105 are powered on.

Following initiation of the calibration of the speaker arrays 105 at operation 601, operation 603 may attempt to detect the speaker arrays 105 on a shared network. For example, as described above, the computing device 701 may share a wireless network with the speaker arrays 105. In this example, the computing device 701 may detect the speaker arrays 105 coupled to the shared network. The detection may include the determination of an internet protocol (IP) address and/or a media access control (MAC) address associated with each of the speaker arrays 105. In one embodiment, the detection of the speaker arrays 105 over the shared network may include a determination of a class, model, or type of the speaker arrays 105 in addition to IP and/or MAC addresses.

Following detection of the speaker arrays 105 on the shared network, the camera 707 may be activated at operation 605. Although shown as integrated within the computing device 701, in other embodiments the camera 707 may be coupled to the computing device 701 through a wired medium (e.g., Universal Serial Bus or IEEE 1394 interface) or wireless medium (e.g., Bluetooth interface). The camera 707 may be any type of video or still image capture device, including devices that use charge-couple device (CCD) and/or complementary metal-oxide-semiconductor (CMOS) active pixel sensors. In some embodiments, the camera 707 may include one or more lenses for adjusting images and videos captured by the camera 707 (e.g., an optical zoom lens).

Figure 8B:
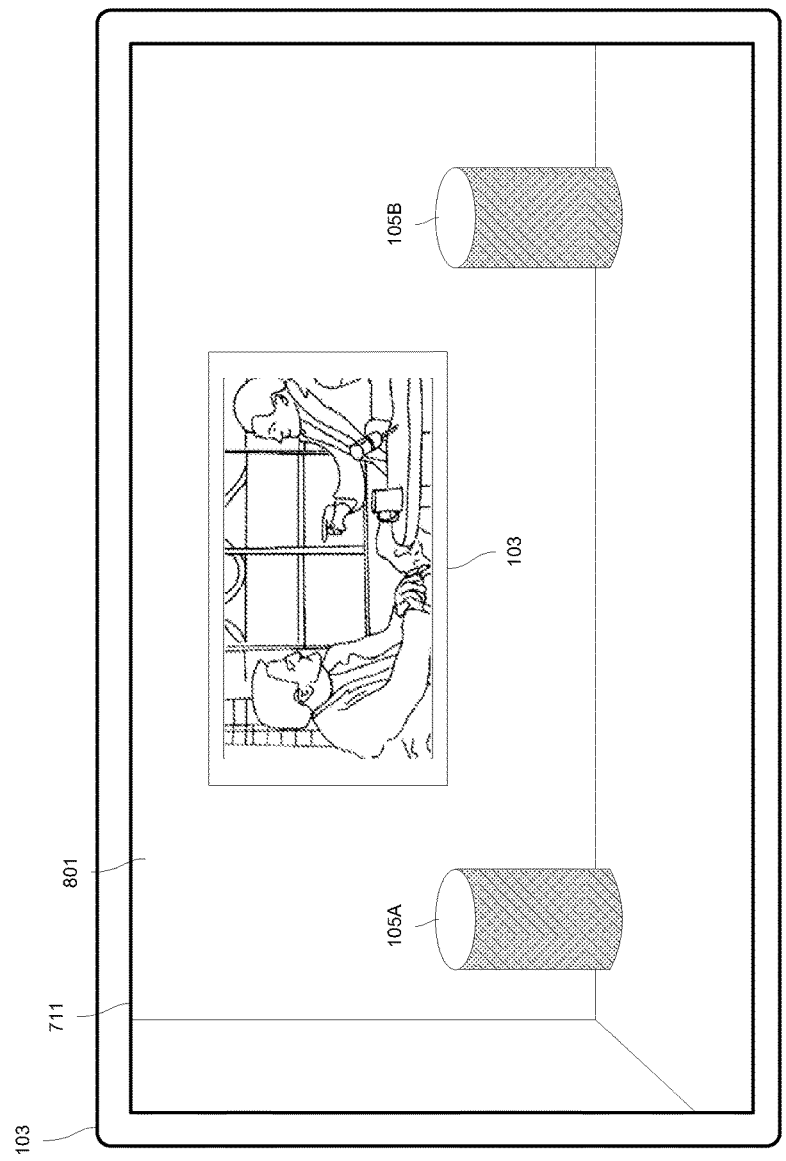
FIG. 8B shows a user interface for capturing video of the listening area according to one embodiment.

In one embodiment, activation of the camera 707 may include the capture of a video stream of the listening area 101 directly in view of the camera 707. For example as shown in FIG. 8B, the camera 707 may capture a video stream of the listening area 101, including the speaker arrays 105A and 105B within the listening area 101. The video stream may be encoded using any video codec or encoding standard, including Moving Picture Experts Group (MPEG) codecs and standards. This video stream may be presented to the user 107 on the display 711 of the computing device 701 as shown in FIG. 8B.

Figure 8C:
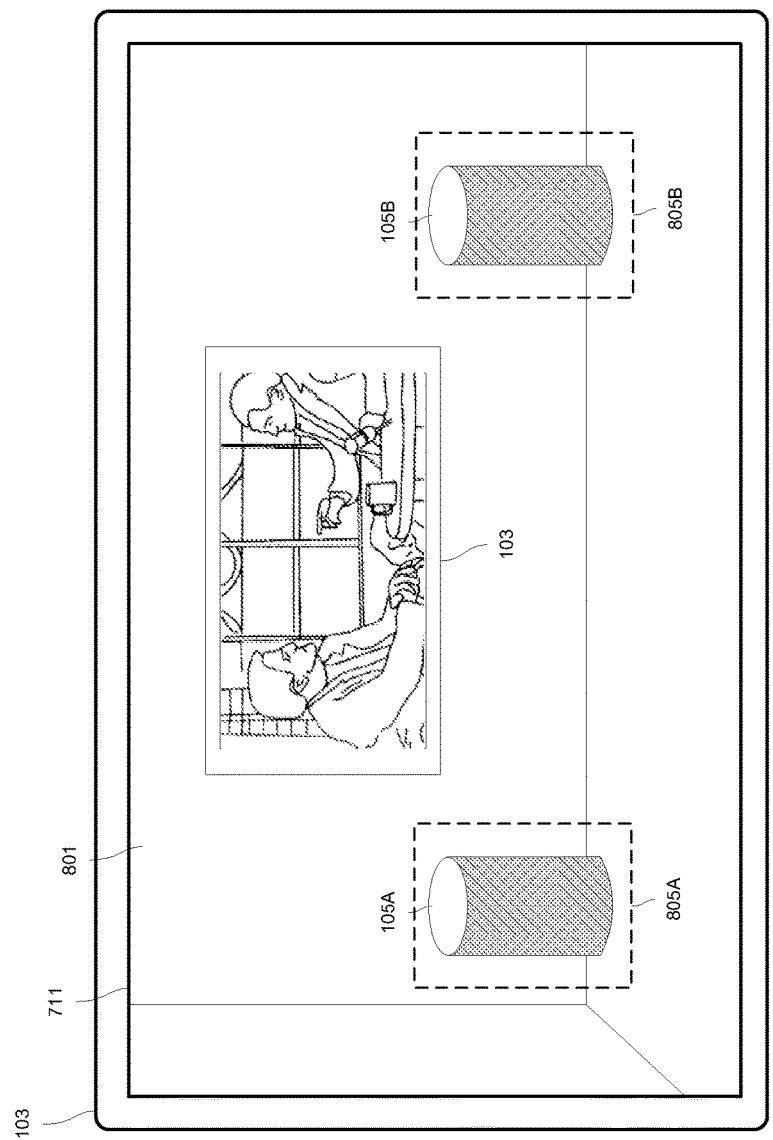
FIG. 8C shows a user interface for identifying speaker arrays in the captured video according to one embodiment.

After the camera 707 has been activated and a video stream has been captured, operation 607 may analyze the video stream to determine the location of one or more of the speaker arrays 105 in the captured video stream. For example, as shown in FIG. 8C, the speaker arrays 105A and 105B may be located and identified by the boxes 805A and 805B, respectively, within the interface 801. The identification of the speaker arrays 105 in the video stream may be performed using any object recognition and/or computer vision technique, including techniques that utilize edge detection, gradient matching, etc.

Given knowledge of the geometry of the camera 707 and the physical dimensions of the speaker arrays 105, operation 607 may estimate the distance between the speaker arrays 105 (e.g., the distance between the speaker arrays 105A and 105B) and/or the distance between one or more of the speaker arrays 105 and the users 107. In one embodiment, the method 600 may assume that at least one of the users 107 is located behind the camera 707. In this embodiment, operation 607 may assume that the user 107 is out of view of the camera 707, but proximate to the computing device 701. In other embodiments, facial recognition algorithms may be used to detect one or more users 107 in the captured video stream. Based on these assumptions regarding the user's 107 position or the detected position of the user 107 in the video stream, operation 607 may estimate the distance between one or more of the speaker arrays 105 and the user 107.

In one embodiment, the method 600 may estimate or determine the size of the speaker arrays 105 based on information retrieved at operation 603. For example, as noted above, operation 603 may determine a type and/or model of speaker arrays 105 on a shared network. This information may be used at operation 605 to develop a scale such that the distance between the speaker arrays 105 or other objects in the listening area 101 may be determined.

In one embodiment, operation 607 may utilize computer vision algorithms to estimate the listening area's 101 size and geometry. This information may be used to determine playback strategies for the speaker arrays 105 as will be described in greater detail below. In one embodiment, this visual mapping may be linked with an acoustic, including ultrasonic, mapping beacon. Using these combined techniques and mechanisms, the size and geometry of the listening area 101 may be better estimated at operation 607.

Although described in relation to the speaker arrays 105 and the users 107, in one embodiment, operation 607 may determine the location of the audio source 103. For example, operation 607 may use computer vision to determine the location of the audio source 103 in relation to one or more of the speaker arrays 105 and/or one or more of the user 107.

In one embodiment, operation 609 may drive the speaker arrays 105 to emit a set of test sounds into the listening area 101. For example, operation 609 may cause the speaker arrays 105A and 105B to sequentially emit a set of test sounds. In some embodiments, the test sounds may be pre-designated sounds while in other embodiments, the test sounds may correspond to a musical composition or an audio track of a movie.

During performance of operation 609, operation 611 may record each of the emitted test sounds. For example, the set of microphones 709 may capture the test sounds produced by each of the speaker arrays 105 at operation 611. Although shown as integrated within the computing device 701, in other embodiments, the set of microphones 709 may be coupled to the computing device 701 through the use of a wired medium (e.g., Universal Serial Bus or IEEE 1394 interface) or wireless medium (e.g., Bluetooth interface). The set of microphones 709 may be any type of acoustic-to-electric transducer or sensor, including a MicroElectrical-Mechanical System (MEMS) microphone, a piezoelectric microphone, an electret condenser microphone, or a dynamic microphone.

In one embodiment, the sounds may be captured at operation 611 in sync with the video stream captured by operation 605. Using these synced captured audio and video streams, operation 613 may prompt the user 107 to select which speaker array 105 in the video stream shown on the display 711 emitted the test sounds. The user 107 may select which speaker array 105 emitted each of the test sounds through the use of a touch screen, a mouse, or any other input mechanism. For example, the display 711 may be a touch screen. In this embodiment, the user 107 may tap an area of the display 711 corresponding to a speaker array 105 that emitted a sound (e.g., the user 107 may select one or more of the boxes 805A and 805B to indicate the order test sounds were played through each speaker array 105).

By allowing the user 107 to select which speaker array 105 output the test sounds, the method 600 and the computing device 701 may determine the correspondence between the speaker arrays 105 identified at operation 603 (i.e., speaker arrays 105 on the shared network) and the speaker arrays 105 identified at operation 607 (i.e., speaker arrays 105 in the captured video) at operation 613. This correspondence may be used by operation 615 to assign roles to each of the speaker arrays 105 based on 1) the determined positions of the speaker arrays 105; 2) the determined positioned of the sound source 103; and/or 3) the determined positions of one or more users 107 in the listening area 101. For example, a speaker array 105 identified at operation 603 to be at address A may be assigned to represent a front right audio channel while a speaker array 105 at address B may be assigned to represent a front left audio channel. This information may be scalable to multiple systems and any number of channels of audio and/or speaker arrays 105.

Although described as discrete speaker arrays 105 that are separate from the audio source 103, in some embodiments the method 600 may similarly apply to speakers and/or speaker arrays integrated within the audio source 103. For example, as shown in FIG. 1 the audio source 103 may be a television. In this embodiment, the audio source 103 may include multiple integrated speaker arrays 105, which may be driven and detected/located in a similar fashion as described above in relation to the speaker arrays 105A and 105B. In these embodiments, the speaker arrays 105 integrated within the audio source 103 may be selected at operation 615 to represent an audio channel for a piece of sound program content. Using the example above, a speaker array 105 external from the audio source 103 and identified at operation 603 to be at address A may be assigned to represent a front right audio channel, a speaker array 105 external from the audio source 103 and identified to be at address B may be assigned to represent a front left audio channel, and a speaker array 105 integrated within the audio source 103 and identified to be at address C may be assigned to represent a front center audio channel.

In one embodiment, operation 617 may utilize the sounds sensed at operation 609 and recorded at operation 611 to generate data describing the listening area 101. For example, the recorded/sensed sounds may be used at operation 617 to calculate equalization curves, reverberation characteristics of the listening area 101, or other calibration factors for the speaker arrays 105. In another example, the recorded/sensed sounds may be used at operation 617 to determine the acoustic difference in time of arrival between sensed sounds from each of the speaker arrays 105. This information may be used to refine the distance estimates between speaker arrays 105 and/or the user 107 generated at operation 607.

Although described above in relation to the positions of the speaker arrays 105 relative to other speaker arrays 105 or other objects in the listening area 101, in some embodiments the method 600 may also determine the orientation of the speaker arrays 105. For example, as shown in FIG. 3A and FIG. 3B, the speaker arrays 105 may be cylindrical with uniform placement of transducers 109 on the cabinet 111. Accordingly, in these embodiments, the method may determine which transducers 109 in the speaker arrays 105 are facing the users 107 or another landmark in the listening area 101. In one embodiment, this determination of orientation may be performed by examining the video stream captured by the camera 707 at operation 605 and/or examining test sounds recorded by the microphones 709 at operation 611. For example, operation 609 may separately drive a plurality of transducers 109 in one or more of the speaker arrays 105 to produce a separate test sounds. These test sounds may be recorded and analyzed at operation 611 to determine the orientation of the speaker arrays 105 based on the arrival time of each of the test sounds at the microphones 709.

At operation 619, one or more pieces of data generated by the previous operations may be transmitted to one or more of the speaker arrays 105 and/or the audio source 103. For example, the roles for each of the speaker arrays 105 determined at operation 615 along with data describing the listening area 101 generated at operations 607 and/or 617 may be transmitted to one or more of the speaker arrays 105 and/or the audio source 103. By understanding the configuration of the speaker arrays 105 and the geometry/characteristics of the listening area 101, the speaker arrays 105 may be driven to more accurately image sounds to the users 107.

As described above, the method 600 detects one or more speaker arrays 105 in the listening area 101 to output sound. This detection may be used to efficiently configure the speaker arrays 105 with minimal user input and with a high degree of accuracy.

Although the operations in the method 600 are described and shown in a particular order, in other embodiments, the operations may be performed in a different order. In some embodiments, two or more operations may be performed concurrently or during overlapping time periods.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for detecting and configuring speaker arrays, comprising:
   detecting, by a computing device, a first set of one or more speaker arrays on a shared network with the computing device, including a determination of a communication protocol address of the first set of one more speaker arrays;
   capturing, by the computing device, video of a listening area in which a second set of one or more speaker arrays are located;
   determining a location of each speaker array in the second set of one or more speaker arrays in the listening area based on the captured video, including an identification of the second set of one or more speaker arrays by object recognition or computer vision;
   driving each speaker array in the first set of speaker arrays sequentially to emit one or more test sounds; and
   determining a location of each speaker array in the first set of one or more speaker arrays in the listening area based on the emitted test sounds and the determined locations of the second set of one or more speaker arrays.

2. The method of claim 1, wherein determining the location of each speaker array in the first set of one or more speaker arrays comprises:
   associating each speaker array in the first set of one or more speaker arrays with a speaker array in the second set of one or more speaker arrays based on the test sounds and the captured video.

3. The method of claim 2, wherein associating each speaker array in the first set of one or more speaker arrays with a speaker array in the second set of one or more speaker arrays comprises:
   prompting a user to select which speaker array in the second set of one or more speaker arrays in the captured video emitted each test sound, wherein the selected speaker arrays in the second set of one or more speaker arrays are associated with corresponding speaker arrays in the first set of one or more speaker arrays that were driven to emit test sounds.

4. The method of claim 3, wherein the location of each speaker array in the second set of one or more speaker arrays in the listening area includes one or more of 1) a distance between each speaker array and another speaker array in the captured video, 2) a distance between each speaker array and the user, and 3) a distance between each speaker array and an audio source.

5. The method of claim 1, further comprising:
   recording each of the test sounds emitted by the first set of one or more speaker arrays; and
   determining characteristics of the listening area based on the recorded tests sounds.

6. The method of claim 5, wherein the characteristics of the listening area include the reverberation characteristics of the listening area.

7. The method of claim 1, further comprising:
   assigning roles to each speaker array in the first set of one or more speaker arrays based on 1) the association of each speaker array in the first set of one or more speaker arrays with a speaker array in the second set of one or more speaker arrays and 2) the determined location of each speaker array in the second set of one or more speaker arrays.

8. The method of claim 7, wherein the roles include channel assignment for an audio piece played by an audio source.

9. A computing device for detecting and configuring speaker arrays, comprising:
a hardware processor; and
a memory unit for storing instructions, which when executed by the hardware processor:
   detect a first set of one or more speaker arrays on a shared network with the computing device, including a determination of a communication protocol address of the first set of one more speaker arrays;
   capture video of a listening area in which a second set of one or more speaker arrays are located;
   determine a location of each speaker array in the second set of one or more speaker arrays in the listening area based on the captured video, including an identification of the second set of one or more speaker arrays by object recognition or computer vision;
   drive each speaker array in the first set of speaker arrays to sequentially emit one or more test sounds; and
   determine a location of each speaker array in the first set of one or more speaker arrays in the listening area based on the emitted test sounds and the determined locations of the second set of one or more speaker arrays.

10. The computing device of claim 9, wherein determining the location of each speaker array in the first set of one or more speaker arrays comprises:
associating each speaker array in the first set of one or more speaker arrays with a speaker array in the second set of one or more speaker arrays based on the test sounds and the captured video.

11. The computing device of claim 10, wherein associating each speaker array in the first set of one or more speaker arrays with a speaker array in the second set of one or more speaker arrays comprises:
prompting a user to select which speaker array in the second set of one or more speaker arrays in the captured video emitted each test sound, wherein the selected speaker arrays in the second set of one or more speaker arrays are associated with corresponding speaker arrays in the first set of one or more speaker arrays that were driven to emit test sounds.

12. The computing device of claim 11, wherein the location of each speaker array in the second set of one or more speaker arrays in the listening area includes one or more of 1) a distance between each speaker array and another speaker array in the captured video, 2) a distance between each speaker array and the user, and 3) a distance between each speaker array and an audio source.

13. The computing device of claim 9, further comprising:
recording each of the test sounds emitted by the first set of one or more speaker arrays; and
determining characteristics of the listening area based on the recorded tests sounds.

14. The computing device of claim 13, wherein the characteristics of the listening area include the reverberation characteristics of the listening area.

15. The computing device of claim 9, further comprising:
assigning roles to each speaker array in the first set of one or more speaker arrays based on 1) the association of each speaker array in the first set of one or more speaker arrays with a speaker array in the second set of one or more speaker arrays and 2) the determined location of each speaker array in the second set of one or more speaker arrays.

16. The computing device of claim 15, wherein the roles include channel assignment for an audio piece played by an audio source.

17. An article of manufacture for detecting and configuring speaker arrays, comprising:
a non-transitory machine-readable storage medium that stores instructions which, when executed by a processor in a computer,
   detect a first set of one or more speaker arrays on a shared network with the computer, including a determination of a communication protocol address of the first set of one more speaker arrays;
   capture video of a listening area in which a second set of one or more speaker arrays are located;
   determine a location of each speaker array in the second set of one or more speaker arrays in the listening area based on the captured video, including an identification of the second set of one or more speaker arrays by object recognition or computer vision;
   generate drive signals for each speaker array in the first set of speaker arrays to sequentially emit one or more test sounds; and
   determine a location of each speaker array in the first set of one or more speaker arrays in the listening area based on the emitted test sounds and the determined locations of the second set of one or more speaker arrays.

18. The article of manufacture of claim 17, wherein the non-transitory machine-readable storage medium stores further instructions which, when executed by the processor:
associate each speaker array in the first set of one or more speaker arrays with a speaker array in the second set of one or more speaker arrays based on the test sounds and the captured video.

19. The article of manufacture of claim 18, wherein the non-transitory machine-readable storage medium stores further instructions which, when executed by the processor:
prompt a user to select which speaker array in the second set of one or more speaker arrays in the captured video emitted each test sound, wherein the selected speaker arrays in the second set of one or more speaker arrays are associated with corresponding speaker arrays in the first set of one or more speaker arrays that were driven to emit test sounds.

20. The article of manufacture of claim 19, wherein the location of each speaker array in the second set of one or more speaker arrays in the listening area includes one or more of 1) a distance between each speaker array and another speaker array in the captured video, 2) a distance between each speaker array and the user, and 3) a distance between each speaker array and an audio source.

21. The article of manufacture of claim 17, wherein the non-transitory machine-readable storage medium stores further instructions which, when executed by the processor:
record each of the test sounds emitted by the first set of one or more speaker arrays; and
determine characteristics of the listening area based on the recorded tests sounds.

22. The article of manufacture of claim 21, wherein the characteristics of the listening area include the reverberation characteristics of the listening area.

23. The article of manufacture of claim 17, wherein the non-transitory machine-readable storage medium stores further instructions which, when executed by the processor:
assign roles to each speaker array in the first set of one or more speaker arrays based on 1) the association of each speaker array in the first set of one or more speaker arrays with a speaker array in the second set of one or more speaker arrays and 2) the determined location of each speaker array in the second set of one or more speaker arrays.

24. The article of manufacture of claim 23, wherein the roles include channel assignment for an audio piece played by an audio source.

\* \* \* \* \*